(12) United States Patent
Thetford et al.

(10) Patent No.: US 8,076,409 B2
(45) Date of Patent: Dec. 13, 2011

(54) DISPERSANT AND COMPOSITIONS THEREOF

(75) Inventors: Dean Thetford, Norden (GB); Neil L. Simpson, Oldham (GB)

(73) Assignee: Lubrizol Limited, Hazelwood, Derby (GB)

( * ) Notice: Subject to any disclaimer, the term of this patent is extended or adjusted under 35 U.S.C. 154(b) by 346 days.

(21) Appl. No.: 12/090,505

(22) PCT Filed: Dec. 5, 2006

(86) PCT No.: PCT/US2006/061599
§ 371 (c)(1),
(2), (4) Date: Apr. 17, 2008

(87) PCT Pub. No.: WO2007/111723
PCT Pub. Date: Oct. 4, 2007

(65) Prior Publication Data
US 2008/0281039 A1    Nov. 13, 2008

Related U.S. Application Data

(60) Provisional application No. 60/742,841, filed on Dec. 6, 2005.

(51) Int. Cl.
*C08L 77/00* (2006.01)
*C08L 79/00* (2006.01)
*C08L 79/02* (2006.01)
*D21H 17/55* (2006.01)

(52) U.S. Cl. ........ 524/607; 524/591; 524/590; 524/608; 524/606; 524/592; 524/598; 524/597; 516/20; 516/31

(58) Field of Classification Search ............... 524/607, 524/591, 590, 608, 606, 592, 597; 516/20, 516/31
See application file for complete search history.

(56) References Cited

U.S. PATENT DOCUMENTS
2005/0120911 A1    6/2005  Huber et al.

FOREIGN PATENT DOCUMENTS
| | | |
|---|---|---|
| EP | 0722994 A1 | 7/1996 |
| WO | 01/21298 A1 | 3/2001 |
| WO | 2005/010109 A2 | 2/2005 |
| WO | WO 2005/010109 * | 2/2005 |

\* cited by examiner

*Primary Examiner* — James J Seidleck
*Assistant Examiner* — Deve E Valdez
(74) *Attorney, Agent, or Firm* — Samuel B. Laferty

(57) ABSTRACT

The present invention provides a dispersant and compositions thereof. The dispersant is a residue of a non-aromatic hydrocarbyl substituted carboxylic acid containing three or more acid groups (A), wherein the dispersant may be represented by the Formula and salts thereof: $[U\text{—}(Y)_x\text{-T-N}(R^1)_c\text{-A}]_d\text{-Z}(Q^1)_j\text{-W}_c$, wherein the variables are defined herein.

11 Claims, No Drawings

DISPERSANT AND COMPOSITIONS THEREOF

CROSS REFERENCE TO RELATED APPLICATION

This application claims priority from PCT Application Serial No. PCT/US2006/61599 filed on Dec. 5, 2006, which claims the benefit of U.S. Provisional Application No. 60/742,841 filed on Dec. 6, 2005.

FIELD OF INVENTION

The present invention relates to compositions a particulate solid, an organic medium and/or water and a dispersant comprising a residue of a non-aromatic hydrocarbyl substituted carboxylic acid containing three or more acid groups. The invention further relates to the use in inks, millbases, plastics and paints of the composition. The invention further relates to novel dispersants.

BACKGROUND OF THE INVENTION

Dispersants comprising terminal basic groups, such as, poly(lower alkylene)imine chains are well known and are generally prepared by reaction of the polyimine with polyester chains containing terminal acid groups, the reaction results in a mixture of amide and salt forms. U.S. Pat. No. 4,224,212 discloses dispersants comprising a polyester derived from a hydroxycarboxylic acid with at least 8 carbon atoms reacted with a poly(loweralkylene)imine. Dispersants of this type may be effective in non-polar media, such as, aliphatic solvents and plastics. EP208041 discloses dispersants comprising a polyester derived from ε-caprolactone reacted with a poly(loweralkylene)imine. These dispersants may be effective in more polar media, such as, ketones and esters. However, it would be desirable to have a dispersant which are capable of dispersing a particulate solid in both a polar and a non-polar organic medium. The present invention provides such a dispersant and compositions thereof.

U.S. Pat. No. 4,865,621 discloses motor fuel compositions comprising the reaction product of a dibasic acid anhydride, a polyoxyalkylene monoamine and a hydrocarbyl polyamine having a number average molecular weight of up to 1343.

International Publication WO05/010109 discloses a dispersant comprising the reaction product of a dibasic acid anhydride, a polyoxyalkylene monoamine and a hydrocarbyl polyamine having a number average molecular weight of not less than 1800.

SUMMARY OF THE INVENTION

It has been found that certain dispersants show excellent ability to disperse a particulate solid in a range of organic media, particularly polar organic media and including water. Thus, one embodiment of the present invention provides a composition comprising: a particulate solid, an organic medium and/or water and a dispersant comprising a residue of a non-aromatic hydrocarbyl substituted carboxylic acid containing three or more acid groups (A), wherein the dispersant is represented by the Formula and salts thereof:

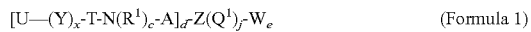 (Formula 1)

wherein
j is zero, or an integer from 1 to 2000;
d is from 2 to 3000, or 4 to 2000;
x is from 2 to 90;
c is 0 or 1;
U is $R^2$—O—, —$NR^3R^4$, or $R^5$—$NR^6$-T-O—;
$R^2$ independently H or $C_{1-30}$-optionally substituted hydrocarbyl groups or hydrocarbonyl (acyl) groups;
$R^1$, $R^3$, $R^4$, $R^5$ and $R^6$ are independently H or $C_{1-30}$-optionally substituted hydrocarbyl groups or hydrocarbonyl groups, or the residue of an epoxide, or the residue of an optionally substituted (meth) acrylic ester or amide group;
Y is $C_{2-4}$-alkyleneoxy; T is $C_{2-4}$ alkylene;
A is the residue of a non-aromatic hydrocarbyl substituted carboxylic acid;
Z is the residue of a polyamine and/or polyimine;
W comprises the residue of an oxide, urea or dibasic acid or anhydride thereof;
$Q^1$ is independently a polyester and/or polyamide chain of formula R'-G-$(M)_m$- or a polyalkoxylate of formula U—$(Y)_x$-T-N($R^1$)-D, or mixtures thereof;
D is a residue of a dibasic acid or anhydride thereof;
m is a positive integer from 2 to 100;
R' is hydrogen or $C_{1-50}$-optionally substituted hydrocarbyl group;
G is a divalent bond or carbonyl;
M is the residue of one or more amino carboxylic acids, one or more hydroxy carboxylic acids, one or more lactones of hydroxycarboxylic acids, or mixtures thereof; and
e is 0 to v, wherein v represents the maximum available number of amino and/or imino groups in Z which does not carry the groups U—$(Y)_x$-T-N($R^1$)-A- or $Q^1$.

In one embodiment, the invention provides a dispersant comprising: a residue of a non-aromatic hydrocarbyl substituted carboxylic acid containing three or more acid groups (A), wherein the dispersant is represented by the Formula and salts thereof:

 (Formula 1)

wherein the variables of Formula (1) are described herein above.

In one embodiment, the invention provides a dispersant comprising: a residue of a non-aromatic hydrocarbyl substituted carboxylic acid containing three or more acid groups (A), wherein the dispersant is represented by the Formula and salts thereof:

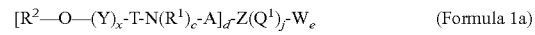 (Formula 1a)

wherein
j is zero, or an integer from 1 to 2000;
d is from 2 to 3000, or 4 to 2000;
c is 0 or 1;
x is from 2 to 90;
$R^2$ is independently H or $C_{1-30}$-optionally substituted hydrocarbyl groups or hydrocarbonyl (acyl) groups;
$R^1$ is independently H or $C_{1-30}$-optionally substituted hydrocarbyl groups or hydrocarbonyl groups, or the residue of an epoxide, or the residue of an optionally substituted (meth) acrylic ester or amide group;
Y is $C_{2-4}$-alkyleneoxy; T is $C_{2-4}$ alkylene;
A is the residue of a non-aromatic hydrocarbyl substituted carboxylic acid;
Z is the residue of a polyamine and/or polyimine;
W comprises the residue of an oxide, urea or dibasic acid or anhydride thereof;
$Q^1$ is independently a polyester and/or polyamide chain of formula R'-G-$(M)_m$- or a polyalkoxylate of formula U—$(Y)_x$-T-N($R^1$)-D, or mixtures thereof;
D is a residue of a dibasic acid or anhydride thereof;
m is a positive integer from 2 to 100;

R' is hydrogen or $C_{1-50}$-optionally substituted hydrocarbyl group;

G is a divalent bond or carbonyl;

M is the residue of one or more amino carboxylic acids, one or more hydroxy carboxylic acids, one or more lactones of hydroxycarboxylic acids, or mixtures thereof; and e is 0 to v, wherein v represents the maximum available number of amino and/or imino groups in Z which does not carry the groups $R^2$—O—$(Y)_x$-T-N$(R^1)_c$-A- or $Q^1$.

In one embodiment, the invention provides a composition comprising: a particulate solid, an organic medium and/or water and a dispersant comprising a residue of a non-aromatic hydrocarbyl substituted carboxylic acid containing three or more acid groups (A), wherein the dispersant is represented by the Formula and salts thereof:

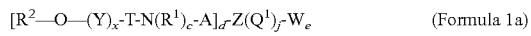
$$[R^2\text{—O—}(Y)_x\text{-T-N}(R^1)_c\text{-A}]_d\text{-Z}(Q^1)_j\text{-W}_e \quad \text{(Formula 1a)}$$

wherein the variables of Formula (1a) are described herein above.

In one embodiment, the invention provides a composition comprising a particulate solid, an organic medium and/or water and a dispersant comprising a residue of a non-aromatic hydrocarbyl substituted carboxylic acid containing three or more acid groups (A), wherein the dispersant is represented by the Formula and salts thereof:

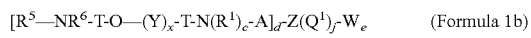
$$[R^5\text{—NR}^6\text{-T-O—}(Y)_x\text{-T-N}(R^1)_c\text{-A}]_d\text{-Z}(Q^1)_j\text{-W}_e \quad \text{(Formula 1b)}$$

wherein j is zero, or an integer from 1 to 2000;

d is from 2 to 3000, or 4 to 2000;

c is 0 or 1;

x is from 2 to 90;

$R^1$, $R^5$ and $R^6$ are independently H or $C_{1-30}$-optionally substituted hydrocarbyl groups or hydrocarbonyl groups, or the residue of an epoxide, or the residue of an optionally substituted (meth) acrylic ester or amide group;

Y is $C_{2-4}$-alkyleneoxy; T is $C_{2-4}$ alkylene;

A is the residue of a non-aromatic hydrocarbyl substituted carboxylic acid;

Z is the residue of a polyamine and/or polyimine;

W comprises the residue of an oxide, urea or dibasic acid or anhydride thereof;

$Q^1$ is independently a polyester and/or polyamide chain of formula R'-G-$(M)_m$- or a polyalkoxylate of formula U—$(Y)_x$-T-N$(R^1)$-D, or mixtures thereof;

D is a residue of a dibasic acid or anhydride thereof;

m is a positive integer from 2 to 100;

R' is hydrogen or $C_{1-50}$-optionally substituted hydrocarbyl group;

G is a divalent bond or carbonyl;

M is the residue of one or more amino carboxylic acids, one or more hydroxy carboxylic acids, one or more lactones of hydroxycarboxylic acids, or mixtures thereof; and e is 0 to v, wherein v represents the maximum available number of amino and/or imino groups in Z which does not carry the groups $R^1$—NR$^6$-T-O—$(Y)_x$-T-N$(R^1)_c$-A- or $Q^1$.

In one embodiment, the invention provides a dispersant comprising: a residue of a non-aromatic hydrocarbyl substituted carboxylic acid containing three or more acid groups (A), wherein the dispersant is represented by the Formula and salts thereof:

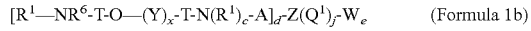
$$[R^1\text{—NR}^6\text{-T-O—}(Y)_x\text{-T-N}(R^1)_c\text{-A}]_d\text{-Z}(Q^1)_j\text{-W}_e \quad \text{(Formula 1b)}$$

wherein the variables of Formula (1b) are described herein above.

Since Z is the residue of a polyamine and/or polyimine, there is typically more than 2 groups [U—$(Y)_x$-T-N$(R^1)_c$-A]- attached to Z and these may be the same or different.

DETAILED DESCRIPTION OF THE INVENTION

The present invention provides dispersants and compositions as described above.

When c is 0 (zero), N of Formula (1), (1a) or (1b) is believed to form a cyclic imide structure with the variable A.

A further variant on the first aspect of the invention is a dispersant of Formula 1 which contains two or more different [U—$(Y)_x$-T-N$(R^1)_c$-A] chains. These chains may be of the same, similar or different hydrophilicity/hydrophobicity depending on the nature of the particulate solid to be dispersed and the nature of the liquid medium. Thus, when for example, the dispersant of Formula 1 contains different chains, one may be derivable from certain choices of U, Y, T, $R^1$, x, and A within the disclosure while the other is derivable from slightly different choices for the variables within the disclosure.

In one embodiment A, the residue of a non-aromatic hydrocarbyl substituted carboxylic acid contains three to six, or three to four, or three acid groups. In one embodiment, the acid groups may be esterified to form carboxylic ester groups. Typically, the ester groups may contain up to 6 carbon atoms.

Examples of a suitable acid useful to prepare the residue of a non-aromatic hydrocarbyl substituted carboxylic acid include agaric acid, citric acid (2-hydroxy-1,2,3,-propanetricarboxylic acid), 1,3,5-cyclohexanenetric carboxylic acid, 1,2,3-propanetricarboxylic acid (tricarballylic acid), 1-propene-1,2,3-tricarboxylic acid, N-[1,2-dicarboxyethyl]-L-aspartic acid, 1,2,5-pentanetricarboxylic acid, 1,3,5-pentanetricarboxylic acid, 3-butene-1,2,3-tricarboxylic acid, 1,2,3,4-butanetetracarboxylic acid, ethylenediamine tetraacetic acid (EDTA), ethylenediamine tetrapropionic acid, N,N'-ethylene di-(L-aspartic acid), or mixtures thereof, or (partial or full) esters thereof, or an acid halide (e.g., chloride) thereof, or anhydride thereof.

As used herein the term "partial esters" means that one or more (but not all) of the acid groups available is functionalised to form a carboxylic ester group. In different embodiments, the number of carboxylic ester groups varies from 0 to 6, or 0 to 4 or 0 to 2. In one embodiment, the residue of a non-aromatic hydrocarbyl substituted carboxylic acid does not contain additional carboxylic ester groups. In one embodiment, the residue of a non-aromatic hydrocarbyl substituted carboxylic acid containing three or more acid groups (A) comprises citric acid, agaric acid, 1,3,5-pentanetricarboxylic acid, 1,2,3,4-butanetetracarboxylic acid, or mixtures thereof, or (partial or full) esters thereof, or an acid halide thereof or an anhydride thereof. In one embodiment, the residue of a non-aromatic hydrocarbyl substituted carboxylic acid comprises citric acid or mixtures thereof, or (partial or full) esters thereof, or an acid halide thereof, or anhydride thereof.

When U is $R^2$—O—, the $R^2$—O—$(Y)_x$-T-N group of Formula (1) may be the residue of a polyalkyleneoxide monoalkyl ether monoamine. The $R^2$—O—$(Y)_x$-T-N group, may be the residue of commercially available compounds, such as, the Jeffamine™ M-series of monoamines from Huntsman Corporation. Specific examples of Jeffamine™ amines are M-600 (9,0,600), M-1000 (3,18,1000), M-2005 (32,2,2000) and M-2070 (10, 31, 2000). The figures in parentheses are approximate repeat units of propylene oxide, ethylene oxide and number-average molecular weight respectively.

When U is $R^5$—NR$^6$-T-O—, the $R^5$—NR$^6$-T-O— $(Y)_x$-T-N group of Formula (1) may be the residue of a polyalkyleneoxide diamine. Compounds of this type are commercially available as the Jeffamine™ D or ED-series of diamines from Huntsman Corporation. Specific examples of Jeffamine™ diamines are D-230 (3,0,230), D-400 (6,0,400), D-2000 (33,0,2000), D-4000 (68,0,4000), ED-600 (3,6,9,600), ED-900 (2.5,15.5,900) and ED2003 (6,39,2000). The figures in parentheses are approximate repeat units of propylene oxide, ethylene oxide and number-average molecular weight, respectively.

In one embodiment, $R^1$ to $R^6$ are hydrocarbyl groups including aryl, aralkyl, alkaryl, cycloalkyl or alkyl, which may be linear or branched.

In one embodiment, $R^1$ to $R^6$ are alkyl, optionally a branched alkyl containing $C_{1-30}$, $C_{1-20}$, $C_{1-6}$ or $C_{1-4}$-alkyl. In one embodiment, $R^2$ is a methyl.

When $R^1$ to $R^6$ are substituted hydrocarbyl groups, the substituent may be $C_{1-10}$-alkoxy, carbonyl, sulphonyl, carbamoyl, sulphamoyl, halogen, nitrile, ureido, hydroxyl, urethane or ester (i.e., —COO— or —OCO—). In one embodiment, $R^1$ to $R^6$ are unsubstituted.

In one embodiment, $R^1$ to $R^6$ are aryl including naphthyl or phenyl. In one embodiment, $R^1$ to $R^6$ are aralkyl including 2-phenylethyl or benzyl.

In one embodiment, $R^1$ to $R^6$ are alkaryl including octyl phenyl or nonyl phenyl.

In one embodiment, $R^1$ to $R^6$ are cycloalkyl including $C_{3-8}$-cycloalkyl, such as, cyclopropyl or cyclohexyl.

The residue of an optionally substituted (meth) acrylic ester or amide group as defined in $R^1$, $R^3$ to $R^6$ may contain substituted groups, such as hydrocarbyl groups, alkyl or aryl groups. The hydrocarbyl groups, alkyl or aryl groups may be defined in the same way as those described for $R^1$, $R^3$ to $R^6$ (as discussed herein).

In one embodiment, $R^1$, $R^3$ to $R^6$ comprises the residue of an optionally substituted (meth) acrylic ester or amide group, or mixtures thereof. In one embodiment, $R^1$, $R^3$ to $R^6$ comprises the residue of an alkyl (meth)acrylate, or mixtures thereof. In one embodiment, $R^1$, $R^3$ to $R^6$ comprises the residue of an alkyl (meth)acrylamide, or mixtures thereof.

In different embodiments, T comprises $C_{3-4}$-alkylene groups, or —CH$_2$CH(CH$_3$)— groups, or —CH$_2$CH$_2$CH$_2$— groups. In one embodiment, T comprises —CH$_2$CH(CH$_3$)—.

When Y is $C_{3-4}$-alkyleneoxy, and the chain represented by $(Y)_x$ contains ethyleneoxy (—CH$_2$CH$_2$O—), the structure of $(Y)_x$ may be random or block.

The chain represented by $(Y)_x$ may contain only one type of $C_{3-4}$-alkyleneoxy repeat unit or it may contain two or more different $C_{3-4}$-alkyleneoxy repeat units. When the chain represented by $(Y)_x$ contains two or more different $C_{3-4}$-alkyleneoxy repeat units, the structure of $(Y)_x$ may be random or block.

In one embodiment, Y is a $C_{3-4}$-alkyleneoxy group, —CH$_2$CH$_2$CH$_2$CH$_2$O— or —CH$_2$CH(CH$_3$)CH$_2$O— or —CH$_2$CH(CH$_3$)O—. In another embodiment, Y is a —CH$_2$CH$_2$CH(CH$_3$)O— or —CH$_2$—CH(CH$_2$—CH$_3$)—O—. In one embodiment, Y is $C_{3-4}$-alkyleneoxy and the chain represented by $(Y)_x$ is —CH$_2$CH$_2$CH$_2$CH$_2$O—, —CH$_2$CH(CH$_3$)O— or —CH$_2$—CH(CH$_2$—CH$_3$)—O—.

In one embodiment, the dispersant of Formula (1) comprises a Y group of —CH$_3$CH(CH$_3$)O— and the chain represented by $(Y)_x$ may contain no ethyleneoxy repeat units.

In one embodiment, the dispersant of Formula (1) comprises a Y group of —CH$_3$CH(CH$_3$)O— and the chain represented by $(Y)_x$ may contain up to 75% ethyleneoxy repeat units.

In one embodiment, T comprises —CH$_2$CH(CH$_3$)— and Y comprises —CH$_2$CH(CH$_3$)O—.

The group U—$(Y)_x$-T- in one embodiment comprises the residue of a polyalkyleneoxide.

When Z is the residue of a polyamine, it includes polyvinylamine or polyallylamine. Polyallylamine and poly(N-alkyl)allylamines of differing molecular weight are commercially available from Nitto Boseki. Polyvinylamine of differing molecular weight are available from Mitsubishi Kasei.

In one embodiment, Z is the residue of a polyimine and includes poly ($C_{2-6}$-alkyleneimine), and especially polyethyleneimine (PEI). The polyimine may be linear or especially branched. Linear polyethyleneimine may be prepared by the hydrolysis of poly(N-acyl)alkyleneimines as described, for example, by Takeo Saegusa et al in Macromolecules, 1972, Vol. 5, page 4470. Branched polyethyleneimines of differing molecular weight are commercially available from BASF and Nippon Shokubai. Polypropyleneimine dendrimers are commercially available from DSM Fine Chemicals and poly(amidoamine) dendrimers are available as "Starburst" dendrimers from Aldrich Chemical Company.

Examples of a suitable polyamine include tetraethylene pentamine, pentaethylenehexamine, diethylenetriamine, or triethylenetetramine. Other useful types of polyamine mixtures are those resulting from stripping of the above-described polyamine mixtures to leave as residue what is often termed "polyamine bottoms". In general, alkylenepolyamine bottoms may be characterised as having less than two, usually less than 1% (by weight) material boiling below about 200° C. A typical sample of such ethylene polyamine bottoms obtained from the Dow Chemical Company of Freeport, Tex. designated "E-100" has a specific gravity at 15.6° C. of 1.0168, a percent nitrogen by weight of 33.15 and a viscosity at 40° C. of 121 centistokes. Gas chromatography analysis of such a sample contains about 0.93% "Light Ends" (most probably DETA), 0.72% TETA, 21.74% tetraethylene pentamine and 76.61% pentaethylenehexamine and higher (by weight). These alkylenepolyamine bottoms include cyclic condensation products such as piperazine and higher analogs of diethylenetriamine or triethylenetetramine.

The number average molecular weight of the polyamine or polyimine in one embodiment is from 200 to 650,000, 500 to 600,000, 550 to 100,000, or 600 to 70,000. In the case of polyethyleneimine, the number-average molecular weight in one embodiment is not less than 600, or not less than 1200.

The residue of dibasic acid represented by W and/or D may be derived from any dibasic acid of formula HOOC—B—COOH or anhydride thereof (or esters anhydrides or acid halides of said anhydrides), wherein B is a direct bond or a divalent organic moiety containing from 1 to 20 carbon atoms. B may be aromatic, hetero aromatic, alicyclic or aliphatic which may be optionally substituted. When B is aliphatic containing two or more carbon atoms, it may be linear or branched, saturated or unsaturated. In one embodiment B is unsubstituted. In another embodiment, B contains not greater than 12 carbon atoms and in another embodiment not greater than 8 carbon atoms.

When B is aromatic, it includes phenylene, when B is alicyclic, it includes cyclohexylene, and when B is aliphatic, it includes an alkylene. In one embodiment, the dibasic acids are terephthalic, tetrahydrophthalic, methyl tetrahydrophthalic, hexahydrophthalic, methyl hexahydrophthalic, trimellitic, $C_{1-20}$-alkenyl or alkyl succinic acids. In one embodiment, the dibasic acids are derived from maleic, malonic, succinic or phthalic acid or esters anhydrides or acid halides of said acids. When the dibasic acid is derived from an anhydride, suitable examples are derived from glutaric, succinic, maleic anhydride or phthalic anhydride, or esters anhydrides or acid halides of said anhydrides.

Mixtures of dibasic acids or anhydrides thereof may be used. Thus, W and/or D may be the residue of one or more than one different dibasic acid or anhydride. In one embodiment, W comprises the residue of a single dibasic acid or anhydride.

The dispersant of Formula 1 where v is zero may be in the form of a salt of a coloured acid. The coloured acid may be any anionic dyestuff such as sulphonated or carboxylated copper or nickel phthalocyanine containing on average 0.5 to 3 sulphonic acid groups per molecule or a disazo dyestuff containing a sulphonic acid and/or carboxylic acid group.

When v is zero, some of the amine/imine groups in Z which do not carry the group $[U-(Y)_x-T-N(R^1)_c-A]-$ or $Q^1$ may be converted into substituted ammonium groups by reaction with an acid or quaternising agent. Suitable reagents for this purpose include mineral and strong acids such as hydrochloric acid, acetic acid, sulphuric acid, alkyl sulphonic acids, alkyl hydrogen sulphates or aryl sulphonic acids. Quaternisating agents include dimethyl sulphate, benzyl chloride, methyl halides such as chlorine, bromine and iodine, and propane (or butane) sultone.

The dispersant of Formula (1) may be made by any method known to the art. A precursor to Formula (1) before reaction with polyamine and/or polyimine may be prepared by the processes described in U.S. 2005/0120911 and WO05/010109.

The reaction with the polyamine and/or polyimine is carried out in one embodiment at a temperature of from 100° C. to 200° C. Under such conditions, the reaction results in a mixture of amide and salt forms rather than the salt form alone.

The reaction involving the dibasic acid or anhydride thereof is typically carried out in the presence of an organic diluent which is inert to the reactants. In one embodiment, the organic diluent is a solvent for the reactants. The organic diluent may be aromatic or aliphatic including halogenated derivatives. Examples are toluene, chlorobenzene, heptane and petroleum ether distillates. Typically, the reaction is carried out in the absence of an organic diluent.

When W comprises the residue of an oxide, the number of amino and/or imine groups in Z which do not carry the group $[U-(Y)_x-T-N(R^1)_c-A]-$ or $Q^1$ may vary over wide limits. Such dispersants are easily prepared by reacting dispersants containing free amino and/or imino groups with an oxidising compound such as oxygen (or air) or a peroxide such as hydrogen peroxide or ammonium persulphate. Similarly, when W comprises the residue of urea, such dispersants may also be readily prepared by reacting any free amino and/or imino groups in Z which do not carry the group $[U-(Y)_x-T-N(R^1)_c-A]-$ or $Q^1$ with urea. In one embodiment, the reaction is carried out in an inert atmosphere at a temperature between 80° C. and 140° C.

In the specific case where W comprises the residue of a dibasic acid or anhydride thereof, the majority of amino and/or imino groups in Z which do not carry the group $[U-(Y)_x-T-N(R^1)_c-A]-$ or $Q^1$ are reacted with the dibasic acid or anhydride.

In one embodiment, G is carbonyl and R'-G- is the residue of a $C_{1-50}$-optionally substituted hydrocarbyl carboxylic acid and especially a $C_{1-50}$-optionally substituted aliphatic acid where the aliphatic group may be saturated or unsaturated, linear or branched.

In one embodiment, R' contains not greater than 30 carbon atoms. R'—CO— may also be the residue of a linear or branched, saturated or unsaturated optionally substituted carboxylic acid such as methoxy-acetic acid, propionic acid, butyric acid, hexanoic acid, octanoic acid, lauric acid, dodecanoic acid, stearic acid, 2-ethyl butyric acid, 2-ethyl hexanoic acid, 2-butyl octanoic acid, 2-hexyl decanoic acid, 2-octyl decanoic acid and 2-decyl tetra decanoic acid. Branched alkyl carboxylic acids of this type are also available under the trade name Isocarb™ (ex Condea GmbH) and specific examples are Isocarb™ 12, 16, 20, 28, 32, 34T and 36.

When R' is substituted, the substituent may be one or more ether groups or two or more ether groups. Thus, R'—CO— may be the residue of an Akypo™ carboxylic acid (ex Kao Chem GmbH). Specific examples are Akypo™ LF1, Akypo™ LF2, Akypo™ RLM 25, Akypo™ RLM 45 CA, Akypo™ RO 20 VG and Akypo™ RO 50 VG.

The amino carboxylic acid from which M is obtainable includes amino-$C_{2-20}$-alk(en)ylene carboxylic acid or an amino $C_{1-20}$-alkylene carboxylic acid. In one embodiment, the alk(en)ylene group contains not greater than 12 carbon atoms. Specific examples are 11-amino undecanoic acid, 6-amino caproic acid, 4-amino butyric acid, β-alanine or sarcosine.

The hydroxy carboxylic acid from which M is derivable includes a hydroxy-$C_{2-20}$-alkenylene carboxylic acid or a hydroxy-$C_{1-20}$ alkylene carboxylic acid. Specific examples of suitable hydroxy carboxylic acids are ricinoleic acid, 12-hydroxystearic acid, 6-hydroxy caproic acid, 5-hydroxy valeric acid, 12-hydroxy dodecanoic acid, 5-hydroxy dodecanoic acid, 5-hydroxy decanoic acid, 4-hydroxy decanoic acid, 10-hydroxy undecanoic acid, lactic acid or glycolic acid.

M is also derivable from a lactone such as β-propiolactone, optionally $C_{1-6}$-alkyl substituted ε-caprolactone and optionally $C_{1-6}$-alkyl substituted δ-valerolactone. Specific examples are ε-caprolactone and the 7-methyl-, 3-methyl-, 5-methyl-, 6-methyl-, 4-methyl-, 5-tetra-butyl-, 4,4,6-trimethyl- and 4,6,6-trimethyl-ε-caprolactone and δ-valerolactone.

In one embodiment, the ratio of d to j is from 6:1 to 1:6.

The particulate solid present in the composition may be any inorganic or organic solid material which is substantially insoluble in the organic medium. In one embodiment, the particulate solid is a pigment.

Examples of suitable solids are pigments for solvent inks; pigments, extenders and fillers for paints and plastics materials; disperse dyes; optical brightening agents and textile auxiliaries for solvent dyebaths, inks and other solvent application systems; solids for oil-based and inverse-emulsion drilling muds; dirt and solid particles in dry cleaning fluids; particulate ceramic materials; magnetic materials and magnetic recording media; fibres such as glass, steel, carbon and boron for composite materials, and biocides, agrochemicals and pharmaceuticals which are applied as dispersions in organic media.

In one embodiment, the solid is an organic pigment from any of the recognised classes of pigments described, for example, in the Third Edition of the Colour Index (1971) and subsequent revisions of, and supplements thereto, under the chapter headed "Pigments". Examples of organic pigments are those from the azo, disazo, condensed azo, thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. In one embodiment, the organic pigments are phthalocyanines, especially copper phthalocyanines, monoazos, disazos, indanthrones, anthranthrones, quinacridones and carbon blacks.

Inorganic solids include: extenders and fillers such as talc, kaolin, silica, barytes and chalk; particulate ceramic materials such as alumina, silica, zirconia, titania, silicon nitride, boron nitride, silicon carbide, boron carbide, mixed silicon-aluminium nitrides and metal titanates; particulate magnetic materials such as the magnetic oxides of transition metals, especially iron and chromium, e.g., gamma-$Fe_2O_3$, $Fe_3O_4$, and cobalt-doped iron oxides, calcium oxide, ferrites, especially barium ferrites; and metal particles, especially metallic iron, nickel, cobalt, copper and alloys thereof.

Other useful solid materials include agrochemicals such as the fungicides flutriafen, carbendazim, chlorothalonil and mancozeb.

The organic medium present in the composition of the invention in one embodiment is a plastics material and in another embodiment an organic liquid. The organic liquid may be a non-polar or a polar organic liquid, although a polar organic liquid is typically used. By the term "polar" in relation to the organic liquid, it is meant that an organic liquid is capable of forming moderate to strong bonds as described in the article entitled "A Three Dimensional Approach to Solubility" by Crowley et al. in Journal of Paint Technology, Vol. 38, 1966, at page 269. Such organic liquids generally have a hydrogen bonding number of 5 or more as defined in the above-mentioned article.

Examples of suitable polar organic liquids are amines, ethers, especially lower alkyl ethers, organic acids, esters, ketones, glycols, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39-40, and these liquids all fall within the scope of the term polar organic liquid as used herein.

In one embodiment, polar organic liquids are dialkyl ketones, alkyl esters of alkane carboxylic acids and alkanols, especially such liquids containing up to, and including, a total of 6 carbon atoms. As examples of the polar organic liquids include dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxy propylacetate and ethyl butyrate; glycols and glycol esters and ethers, such as ethylene glycol, 2-ethoxyethanol, 3-methoxypropylpropanol. 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol and dialkyl and cyclic ethers such as diethyl ether and tetrahydrofuran. In one embodiment, solvents are alkanols, alkane carboxylic acids and esters of alkane carboxylic acids.

Examples of organic liquids, which may be used as polar organic liquids are film-forming resins such as, are suitable for the preparation of inks, paints and chips for use in various applications such as paints and inks. Examples of such resins include polyamides, such as Versamid™ and Wolfamid™, and cellulose ethers, such as ethyl cellulose and ethyl hydroxyethyl cellulose, nitrocellulose and cellulose acetate butyrate resins, including mixtures thereof. Examples of paint resins include short oil alkyd/melamine-formaldehyde, polyester/melamine-formaldehyde, thermosetting acrylic/ melamine-formaldehyde, long oil alkyd, polyether polyols and multi-media resins such as acrylic and urea/aldehyde.

The organic liquid may be a polyol, that is to say, an organic liquid with two or more hydroxy groups. In one embodiment, polyols include alpha-omega diols or alpha-omega diol ethoxylates.

In one embodiment, non-polar organic liquids are compounds containing aliphatic groups, aromatic groups or mixtures thereof. The non-polar organic liquids include non-halogenated aromatic hydrocarbons (e.g., toluene and xylene), halogenated aromatic hydrocarbons (e.g., chlorobenzene, dichlorobenzene, chlorotoluene), non-halogenated aliphatic hydrocarbons (e.g., linear and branched aliphatic hydrocarbons containing six or more carbon atoms both fully and partially saturated), halogenated aliphatic hydrocarbons (e.g., dichloromethane, carbon tetrachloride, chloroform, trichloroethane) and natural non-polar organics (e.g., vegetable oil, sunflower oil, linseed oil, terpenes and glycerides).

In one embodiment, the organic liquid comprises at least 0.1% by weight, or 1% by weight or more of a polar organic liquid based on the total organic liquid.

The organic liquid optionally further comprises water. In one embodiment, the organic liquid is free of water.

When the organic liquid contains water, the amount present in one embodiment is not greater than 70%, not greater than 50% or not greater than 40% by weight based on the amount of organic liquid.

The plastics material may be a thermoset resin or a thermoplastic resin. The thermosetting resins useful in this invention include resins which undergo a chemical reaction when heated, catalysed, or subject to UV radiation and become relatively infusible. Typical reactions in thermosetting resins include oxidation of unsaturated double bonds, reactions involving epoxy/amine, epoxy/carbonyl, epoxy/hydroxyl, polyisocyanate/hydroxy, amino resin/hydroxy moieties, free radical reactions or polyacrylate, cationic polymerization or epoxy resins and vinyl ether, condensation of silanol, etc.

Polymers with hydroxy functionality (frequently polyols) are widely used in thermosetting system to crosslink with amino resins or polyisocyanates. The polyols include acrylic polyols, alkyd polyols, polyester polyols, polyether polyols and polyurethane polyols. Typical amino resins include melamine formaldehyde resins, benzoguanamine formaldehyde resins, urea formaldehyde resins and glycoluril formaldehyde resins. Polyisocyanates are resins with two or more isocyanate groups, including both monomeric aliphatic diisocyanates, monomeric aromatic diisocyanates and their polymers. Typical aliphatic diisocyanates include hexamethylene diisocyanate, isophorone diisocyanate and hydrogenated diphenylmethane diisocyanate. Typical aromatic isocyanates include toluene diisocyanates and biphenylmethane diisocyanates.

In one embodiment, thermoplastic resins include polyolefins, polyesters, polyamides, polycarbonates, polyurethanes, polystyrenics, poly(meth)acrylates, celluloses and cellulose derivatives. Said compositions may be prepared in a number of ways but melt mixing and dry solid blending are typical methods.

If desired, the compositions may contain other ingredients, for example, resins (where these do not already constitute the organic medium), binders, fluidising agents anti-sedimentation agents, plasticisers, surfactants, anti-foamers, rheology modifiers, levelling agents, gloss modifiers and preservatives.

The compositions typically contain from 1 to 95% by weight of the particulate solid, the precise quantity depending on the nature of the solid and the quantity depending on the nature of the solid and the relative densities of the solid and the polar organic liquid. For example, a composition in which the solid is an organic material, such as an organic pigment, in one embodiment contains from 15 to 60% by weight of the solid whereas a composition in which the solid is an inorganic material, such as an inorganic pigment, filler or extender, in one embodiment contains from 40 to 90% by weight of the solid based on the total weight of composition.

The composition may be prepared by any of the conventional methods known for preparing dispersions. Thus, the solid, the organic medium and the dispersant may be mixed in any order, the mixture then being subjected to a mechanical treatment to reduce the particles of the solid to an appropriate size, for example, by ball milling, bead milling, gravel milling or plastic milling until the dispersion is formed. Alternatively, the solid may be treated to reduce its particle size independently or in admixture with either the organic medium or the dispersant, the other ingredient or ingredients then being added and the mixture being agitated to provide the composition.

The composition of the present invention is particularly suited to liquid dispersions. In one embodiment, such dispersion compositions comprise:
(a) from 0.5 to 30 parts of a particulate solid;
(b) from 0.5 to 30 parts of a dispersant of Formula (1) (or (1a) or (1b)); and
(c) from 40 to 99 parts of an organic liquid; wherein all parts are by weight and the amounts (a)+(b)+(c)=100.

In one embodiment, component a) comprises from 0.5 to 30 parts of a pigment and such dispersions are useful as liquid inks, paints and mill-bases.

If a composition is required comprising a particulate solid and a dispersant of Formula (1) in dry form, the organic liquid is typically volatile so that it may be readily removed from the particulate solid by a simple separation means such as evaporation. In one embodiment, the composition comprises the organic liquid.

If the dry composition consists essentially of the dispersant of Formula (1) and the particulate solid, it typically contains at least 0.2%, at least 0.5% or at least 1.0% dispersant of Formula (1) based on weight of the particulate solid. In one embodiment, the dry composition contains not greater than 100%, not greater than 50%, not greater than 20% or not greater than 10% by weight of dispersant of Formula (1) based on the weight of the particulate solid.

As disclosed hereinbefore, the compositions of the invention are suitable for preparing mill-bases wherein the particulate solid is milled in an organic liquid in the presence of a compound for Formula (1) and salts thereof.

Thus, according to a still further aspect of the invention, there is provided a mill-base comprising a particulate solid, an organic liquid and a dispersant of Formula (1) and salts thereof.

Typically, the mill-base contains from 20 to 70% by weight particulate solid based on the total weight of the mill-base. In one embodiment, the particulate solid is not less than 10 or not less than 20% by weight of the mill-base. Such mill-bases may optionally contain a binder added either before or after milling.

The binder is a polymeric material capable of binding the composition on volatilisation of the organic liquid.

Binders are polymeric materials including natural and synthetic materials. In one embodiment, binders include poly(meth)acrylates, polystyrenics, polyesters, polyurethanes, alkyds, polysaccharides such as cellulose, and natural proteins such as casein. In one embodiment, the binder is present in the composition at more than 100% based on the amount of particulate solid, more than 200%, more than 300% or more than 400%.

The amount of optional binder in the mill-base can vary over wide limits but is typically not less than 10%, and often not less than 20% by weight of the continuous/liquid phase of the mill-base. In one embodiment, the amount of binder is not greater than 50% or not greater than 40% by weight of the continuous/liquid phase of the mill-base.

The amount of dispersant in the mill-base is dependent on the amount of particulate solid but is typically from 0.5 to 5% by weight of the mill-base.

Dispersions and mill-bases made from the composition of the invention are particularly suitable for use in coatings and paints, especially high solids paints; inks, especially flexographic, gravure and screen inks; non-aqueous ceramic processes, especially tape-coating, doctor-blade, extrusion and injection moulding type processes; composites, cosmetics, adhesives and plastics materials.

Thus, according to a further aspect of the present invention, there is provided a paint or ink comprising a particulate solid, an organic liquid, a binder and a dispersant of Formula (1) and salts thereof.

As noted hereinbefore, many of the dispersants of Formula (1) are novel.

According to a still further aspect of the invention, there is provided a dispersant of Formula (1) and salts thereof wherein Z is a polyamine and/or polyimine having a number average molecular weight of not less than 600 and where v is zero.

The invention is further illustrated by the following examples wherein all references to amounts are in parts by weight unless indicated to the contrary.

EXAMPLES

Intermediate 1

Intermediate 1 is prepared by stirring at 150° C. for 8 hours under a nitrogen atmosphere polyalkoxylate (MeO+6 EO+24 PO), $(CH_2)_3NH_2$ (50 g 23.8 mmols) in the presence of citric acid monohydrate (4.91 g 23.3 mmols, ex. Aldrich). The Acid value of the product is measured as 23.2 mg KOH/g.

Intermediate 2

Intermediate 2 is prepared by stirring at 150° C. for 8 hours under a nitrogen atmosphere polyetheramine C12-C15 mixed fatty alcohol ended polypropoxylate amine of approx MW 1650 (as prepared in U.S. Pat. No. 5,094,667, 75 wt. % actives), $(CH_2)_3NH_2$ (50 g 23.8 mmols) and citric acid monohydrate (5.0 g 23.8 mmols, ex. Aldrich). The Acid value of the product is measured as 24.8 mg KOH/g.

Intermediate 3

Intermediate 3 is prepared by stirring at 150° C. for 10 hours under a nitrogen atmosphere Jeffamine M2005 (100 g 50.6 mmols, ex. Huntsman) and tricarballylic acid (8.9 g 50.6 mmols, ex. Fluka). The resulting product is an amber viscous liquid (53 g). The product IR spectrum indicates the presence of imide group ($v_{max}1708$ cm$^{-1}$). The Acid value of the product is measured as 27.4 mg KOH/g.

Intermediate 4

Intermediate 4 is prepared by stirring at 150° C. for 10 hours under a nitrogen atmosphere Jeffamine M2005 (23.7 g 12 mmols, ex. Huntsman) and agaric acid (5 g 12 mmols, ex. Sigma Aldrich). The resulting product is an amber viscous liquid (27 g). The product IR spectrum indicates the presence of imide group ($v_{max}$ 1708 cm$^{-1}$). The Acid value of the product is measured as 22 mg KOH/g.

Intermediate 5

Intermediate 5 is prepared by stirring at 150° C. for 10 hours under a nitrogen atmosphere Jeffamine M2005 (50 g 25.3 mmols, ex. Huntsman) and 1,2,3,4-Butanecarboxylic acid (5.93 g 25.3 mmols, ex. Aldrich). The resulting product is an amber viscous liquid (54 g). The product IR spectrum indicates the presence of imide group ($v_{max}$ 1708 cm$^{-1}$). The Acid value of the product is measured as 45 mg KOH/g.

Intermediate 6

Intermediate 6 is prepared by stirring Jeffamine M2005 (100 g, 50.6 mmols, ex. Huntsman) and citric acid (10.63 g 50.6 mmols, ex. Fisher) at 150° C. for 8 hours under a nitrogen atmosphere. The product is an amber viscous liquid (53 g) analysis using IR indicates the presence of imide group ($v_{max}$ 1708 cm$^{-1}$). The Acid value of the mixture is measured as 26 mg KOH/g.

Intermediate 7

Intermediate 7 is prepared by stirring Jeffamine M2070 (50 g, 24.6 mmols, ex. Huntsman) and ethylenediamine tetraacetic acid dianhydride (3.16 g 12.3 mmols, ex. Aldrich) at 180° C. for 16 hours under a nitrogen atmosphere. The product is a brown viscous liquid (50 g). Analysis of the product by IR indicates the presence of imide group ($v_{max}$ 1708 cm$^{-1}$). The Acid value of the mixture was measured as 10.2 mg KOH/g.

Intermediate 8

Intermediate 8 is the product of Polyester 11 in U.S. Pat. No. 6,787,600.

Intermediate 9

Intermediate 9 is prepared by stirring succinic anhydride (2.5 parts, 25 mmols supplied from Aldrich) and Jeffamine™ M2005 (51 parts, 25 mmols supplied from Huntsman) under a nitrogen gas atmosphere. The temperature is raised to 80° C. and the mixture stirred continuously for a duration of 8 hours. Infra red spectroscopy of the product indicates that substantially all of the anhydride groups have been reacted. The product obtained is a pale yellow viscous oil (53.5 g).

Example 1

Example 1 is prepared by reacting Intermediate 1 (53 g) and PEI SP 200 (3.2 g, ex. Nippon Shokubai) and stirring at 120° C. for 6 hours under a nitrogen atmosphere to give an amber liquid (55 g). The Acid value of the mixture was measured as 16 mg KOH/g.

Example 2

Example 2 is prepared by reacting Intermediate 2 (53 g) and PEI SP 200 (3.2 g, ex. Nippon Shokubai) are stirred at 120° C. for 6 hours under a nitrogen atmosphere to give an amber liquid (55 g). The Acid value of the mixture is measured as 14.5 mg KOH/g.

Example 3

Example 3 is prepared by reacting 18 g of Intermediate 3 with Polyallylamine MW17000 (10 g ex. Aldrich, 20% aqueous solution) at 120° C. for 6 hours under a nitrogen atmosphere to give upon cooling an amber viscous gum (19 g). The Acid value of the mixture is measured as 22.2 mg KOH/g.

Example 4

Example 4 is prepared by reacting 30 g of Intermediate 3 with PEI SP012 (6 g, ex. Nippon Shokubai) at 120° C. for 6 hours under a nitrogen atmosphere to give upon cooling an amber viscous liquid (33 g). The Acid value of the mixture is measured as 15.3 mg KOH/g.

Example 5

Example 5 is prepared by reacting 30 g of Intermediate 3 with Polymin P (4 g, ex. BASF, 50% aqueous solution) at 120° C. for 6 hours under a nitrogen atmosphere to give upon cooling an amber viscous liquid (31 g). The Acid value of the mixture is measured as 23.2 mg KOH/g.

Example 6

Example 6 is prepared by reacting 18 g of Intermediate 4 with Polyethyleneimine SP075 (2.2 g, ex. Nippon Shokubai) at 120° C. for 6 hours under a nitrogen atmosphere to give upon cooling an amber viscous liquid (19 g). The Acid value of the mixture is measured as 18.2 mg KOH/g.

Example 7

Example 7 is prepared by reacting 20 g of Intermediate 5 with Polyethyleneimine SP018 (2 g, ex. Nippon Shokubai) at 120° C. for 6 hours under a nitrogen atmosphere to give upon cooling an amber viscous gum (19 g). The Acid value of the mixture is measured as 35 mg KOH/g.

Example 8

Example 8 is prepared by reacting 18 g of Intermediate 5 with Pentaethylenehexamine (1.5 g ex. Aldrich) at 120° C. for 6 hours under a nitrogen atmosphere to give upon cooling an amber viscous gum (19 g). The Acid value of the mixture is measured as 31.1 mg KOH/g.

Example 9

Example 9 is prepared by stirring Intermediate 6 (54 g) and PEI SP200 (3.36 g, ex. Nippon Shokubai) at 120° C. for 6 hours under a nitrogen atmosphere. On cooling, an amber viscous liquid (55 g) is obtained. The Acid value is measured as 21 mg KOH/g; and the base equivalent is determined to be 1670.

Example 10

Example 10 is prepared by stirring Intermediate 2 (150 g) and PEI SP018 (8.82 g, ex. Nippon Shokubai) at 180° C. for 6 hours under a nitrogen atmosphere. On cooling, the product is a brown viscous liquid (155 g). The Acid value is measured as 6.2 mg KOH/g.

Example 11

Example 11 is prepared by stirring Intermediate 7 (30 g) with PEI SP050 (2.5 g, ex. Nippon Shokubai) at 120° C. for 6 hours under a nitrogen atmosphere. On cooling, the product is a brown viscous liquid (30 g). The Acid value is measured as 4.4 mg KOH/g.

Example 12

Example 12 is prepared by stirring Intermediate 3 (30 g) and PEI SP012 (6 g, ex. Nippon Shokubai) at 120° C. for 6 hours under a nitrogen atmosphere. On cooling, the product is an amber viscous liquid (34 g). The Acid value is measured as 23.2 mg KOH/g.

Example 13

Example 13 is prepared by stirring Intermediate 5 (10 g) and Intermediate 8 (40 g) along with PEI SP075 (5 g, ex. Nippon Shokubai) at 120° C. for 6 hours under a nitrogen atmosphere. The product upon cooling is an amber viscous liquid (53 g). The Acid value is measured as 24.1 mg KOH/g.

Example 14

Example 14 is prepared by stirring Intermediate 3 (30 g) and Intermediate 9 (6 g) along with PEI SP200 (3 g, ex. Nippon Shokubai) at 120° C. for 6 hours under a nitrogen atmosphere. The product is an amber viscous liquid (37 g). The Acid value is measured as 17.3 mg KOH/g.

Example 15

Example 15 is prepared by stirring the product from Example 5 (20 g) and urea (0.56 g, 9.4 mmols ex. Aldrich) at 120° C. for 18 hours under a nitrogen atmosphere. After cooling to 20° C., the product is obtained as an amber viscous liquid (19 g).

Example 16

Example 16 is prepared by stirring the product from Example 6 (15 g) and succinic anhydride (1.5 g, 15 mmols ex. Aldrich) at 80° C. for 2 hours under a nitrogen atmosphere. Upon cooling, an amber viscous liquid (18 g) is obtained. The Acid value is measured as 53.7 mg KOH/g.

Example 17

Example 17 is prepared by stirring the product from Example 9 (20 g) and 35% aqueous hydrogen peroxide solution (2.5 g) at 80° C. for 4 hours under a nitrogen atmosphere until the peroxide had substantially reacted (as confirmed by a negative result using starch iodide paper). The product upon cooling produces an amber viscous liquid (19 g).

Example 18

Example 18 is prepared by stirring the product from Example 9 (20 g) and dimethyl sulphate (0.75 g, 5.9 mmols ex. Aldrich) at 90° C. for 4 hours under a nitrogen atmosphere until substantially all of the dimethyl sulphate reacts (as indicated by bromocresol green indicator). A pale yellow viscous liquid (18 g) is obtained. The Base equivalent is measured at 2850.

Comparative Example 1 is a poly(ε-caprolactone) end-capped with lauric acid and reacted with polyethyleneimine as described in U.S. Pat. No. 4,645,611.

Comparative Example 2 is a millbase without a dispersant present.

Preparation of Mill-Bases

A series of magenta mill-bases are prepared utilising Examples 1 to 2 and Comparative Example 1. The mill-bases are prepared by dissolving Example 1 or 2 (0.45 g) in a solvent mixture of 7.55 g MPA:Butanol ratio of 4:1 (MPA=methoxypropylacetate). Glass beads (3 mm, 17 parts) and Monolite Rubine 3B (ex. Heubach 2.0 parts) are added and the mixture is shaken on a horizontal shaker for 16 hours. The resulting dispersions are then assessed for fluidity using an arbitrary scale of A to E (good to bad). The milling grade obtained for each example is given in Table 1.

| Example | MPA:Butanol |
|---|---|
| 1 | C |
| 2 | C |
| 3 | C/D |
| 4 | A/B |
| 5 | C/D |
| 6 | B |
| 7 | C |
| 8 | B/C |
| 9 | B |
| 10 | B/C |
| 11 | C |
| 12 | B |
| 13 | C |
| 14 | B/C |
| 15 | C |
| 16 | B/C |
| 17 | B/C |
| 18 | C |
| Comparative 1 | C |
| Comparative 2 | E |

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A composition comprising a particulate solid, an organic medium and/or water and a dispersant, wherein the dispersant is represented by the Formula and salts thereof:

$$[U-(Y)_x-T-N(R^1)_c-A]_d-Z(Q^1)_f-W_e \quad \text{(Formula 1)}$$

wherein
j is zero, or an integer from 1 to 2000;
d is from 2 to 3000;
c is 0 or 1;

x is from 2 to 90;

U is $R^2$—O—, —$NR^3R^4$, or $R^5$—$NR^6$-T-O—;

$R^2$ is independently H or $C_{1-30}$-optionally substituted hydrocarbyl groups or hydrocarbonyl (acyl) groups;

$R^1$, $R^3$, $R^4$, $R^5$ and $R^6$ are independently H or $C_{1-30}$-optionally substituted hydrocarbyl groups or hydrocarbonyl groups, or the residue of an epoxide, or the residue of an optionally substituted (meth) acrylic ester or amide group;

Y is $C_{2-4}$-alkyleneoxy; T is $C_{2-4}$ alkylene;

A is the residue of a non-aromatic hydrocarbyl substituted carboxylic acid containing three or more acid groups;

Z is the residue of a polyamine and/or polyimine;

W comprises the residue of an oxide, urea or dibasic acid or anhydride thereof;

$Q^1$ is independently a polyester and/or polyamide chain of formula R'-G-$(M)_m$- or a polyalkoxylate of formula U—$(Y)_x$-T-$N(R^1)_c$-D, or mixtures thereof;

D is a residue of a dibasic acid or anhydride thereof;

m is a positive integer from 2 to 100;

R' is hydrogen or $C_{1-50}$-optionally substituted hydrocarbyl group;

G is a divalent bond or carbonyl;

M is the residue of one or more amino carboxylic acids, one or more hydroxy carboxylic acids, one or more lactones of hydroxycarboxylic acids, or mixtures thereof; and e is 0 to v, wherein v represents the maximum available number of amino and/or imino groups in Z which does not carry the groups U—$(Y)_x$-T-$N(R^1)_c$-A- or $Q^1$.

2. The composition of claim 1, wherein the residue of a non-aromatic hydrocarbyl substituted carboxylic acid (A) comprises three to four carboxylic acid groups.

3. The composition of claim 1, wherein the residue of a non-aromatic hydrocarbyl substituted carboxylic acid containing three or more acid groups (A) comprises at least one of agaric acid, citric acid, 1,3,5-cyclohexanenetric carboxylic acid, 1,2,3-propanetricarboxylic acid, 1-propene-1,2,3-tricarboxylic acid, N-[1,2-dicarboxyethyl]-L-aspartic acid, 1,2,5-pentanetricarboxylic acid, 1,3,5-pentanetricarboxylic acid, 3-butene-1,2,3-tricarboxylic acid, 1,2,3,4-butanetetracarboxylic acid, ethylenediamine tetraacetic acid (EDTA), ethylenediamine tetrapropionic acid, N,N'-ethylene di-(L-aspartic acid) or mixtures thereof, or (partial or full) esters thereof, or an acid halide thereof, or anhydride thereof.

4. The composition of claim 3, wherein the residue of a non-aromatic hydrocarbyl substituted carboxylic acid containing three or more acid groups (A) comprises citric acid, agaric acid, 1,3,5-pentanetricarboxylic acid, 1,2,3,4-butanetetracarboxylic acid, or mixtures thereof, or (partial or full) esters thereof, or an acid halide thereof.

5. The composition of claim 1, wherein Y is $C_{3-4}$-alkyleneoxy and the chain represented by $(Y)_x$ is —$CH_2CH_2CH_2CH_2O$—, —$CH_2CH(CH_3)O$— or —$CH_2$—$CH(CH_2$—$CH_3)$—O—.

6. The composition of claim 1, wherein W is the residue independently derived from the group consisting of maleic acid, malonic acid, succinic and phthalic acid, maleic anhydride, glutaric anhydride, succinic anhydride, phthalic anhydride and trimellitic anhydride, or esters anhydrides or acid halides of said anhydrides.

7. The composition as claimed in claim 1 wherein the group represented by Z is polyethyleneimine.

8. The composition as claimed in claim 1 wherein the organic medium is an organic liquid or a plastics material.

9. The composition as claimed in claim 1 wherein the organic liquid comprises at least 0.1% by weight of a polar organic liquid based on the total organic liquid.

10. The composition as claimed in claim 1 wherein the particulate solid is a pigment.

11. A dispersant comprising a residue of a non-aromatic hydrocarbyl substituted carboxylic acid containing three or more acid groups (A), wherein the dispersant is represented by the Formula and salts thereof:

$$[U—(Y)_x\text{-T-}N(R^1)_c\text{-A}]_d\text{-}Z(Q^1)_f\text{-}W_e \quad \text{(Formula 1)}$$

wherein j is zero, or an integer from 1 to 2000;

d is from 2 to 3000;

c is 0 or 1;

x is from 2 to 90;

U is $R^2$—O—, —$NR^3R^4$, or $R^5$—$NR^6$-T-O—;

$R^2$ is independently H or $C_{1-30}$-optionally substituted hydrocarbyl groups or hydrocarbonyl (acyl) groups;

$R^1$, $R^3$, $R^4$, $R^5$ and $R^6$ are independently H or $C_{1-30}$-optionally substituted hydrocarbyl groups or hydrocarbonyl groups, or the residue of an epoxide, or the residue of an optionally substituted (meth) acrylic ester or amide group;

Y is $C_{2-4}$-alkyleneoxy; T is $C_{2-4}$ alkylene;

A is the residue of a non-aromatic hydrocarbyl substituted carboxylic acid containing three or more acid groups;

Z is the residue of a polyamine and/or polyimine;

W comprises the residue of an oxide, urea or dibasic acid or anhydride thereof;

$Q^1$ is independently a polyester and/or polyamide chain of formula R'-G-$(M)_m$- or a polyalkoxylate of formula U—$(Y)_x$-T-$N(R^1)_c$-D, or mixtures thereof;

D is a residue of a dibasic acid or anhydride thereof;

m is a positive integer from 2 to 100;

R' is hydrogen or $C_{1-50}$-optionally substituted hydrocarbyl group;

G is a divalent bond or carbonyl;

M is the residue of one or more amino carboxylic acids, one or more hydroxy carboxylic acids, one or more lactones of hydroxycarboxylic acids, or mixtures thereof; and e is 0 to v, wherein v represents the maximum available number of amino and/or imino groups in Z which does not carry the groups U—$(Y)_x$-T-$N(R^1)_c$-A- or $Q^1$.

* * * * *